United States Patent [19]

Lussier et al.

[11] Patent Number: 5,420,876
[45] Date of Patent: May 30, 1995

[54] GADOLINIUM VANADATE LASER

[75] Inventors: Jamie N. Lussier, Huber Heights; Daniel R. Klemer, Dayton; Pliny S. Hawthorn, Vandalia; Mark D. Sobottke, Kettering, all of Ohio

[73] Assignee: Spectra-Physics Laserplane, Inc., Dayton, Ohio

[21] Appl. No.: 252,947

[22] Filed: Jun. 2, 1994

[51] Int. Cl.$^6$ .............................................. H01S 3/10
[52] U.S. Cl. ........................................ 372/22; 372/41; 372/108; 372/99; 372/21; 372/92
[58] Field of Search ................... 372/22, 21, 41, 99, 372/108, 92

[56] References Cited

U.S. PATENT DOCUMENTS

| | | |
|---|---|---|
| 3,949,323 | 4/1976 | Bierlein et al. |
| 3,982,201 | 9/1976 | Rosenkrantz et al. |
| 4,035,742 | 7/1977 | Schiffner |
| 4,272,733 | 6/1981 | Walling et al. |
| 4,383,318 | 5/1983 | Barry et al. |
| 4,387,297 | 6/1983 | Swartz et al. |
| 4,413,342 | 11/1983 | Cohen et al. |
| 4,553,238 | 11/1985 | Shaw et al. |
| 4,617,666 | 10/1986 | Liu |
| 4,618,957 | 10/1986 | Liu |
| 4,637,026 | 1/1987 | Liu |
| 4,653,056 | 3/1987 | Baer et al. |
| 4,656,635 | 4/1987 | Baer et al. |
| 4,665,529 | 5/1987 | Baer et al. |
| 4,701,929 | 10/1987 | Baer et al. |
| 4,723,257 | 2/1988 | Baer et al. |
| 4,730,335 | 3/1988 | Clark et al. |
| 4,731,787 | 3/1988 | Fan et al. |
| 4,731,795 | 3/1988 | Clark et al. |
| 4,739,507 | 4/1988 | Byer et al. |
| 4,756,003 | 7/1988 | Baer et al. |
| 4,761,786 | 8/1988 | Baer |
| 4,884,281 | 11/1989 | Hawthorn et al. |
| 4,942,582 | 7/1990 | Kintz ................................ 372/22 |
| 5,128,798 | 7/1992 | Bowen et al. |
| 5,164,947 | 11/1992 | Lukas et al. |

OTHER PUBLICATIONS

Culshaw et al, "Efficient Frequency-Doubled Single-Frequency Nd: YAG Laser", *IEEE Journal of Quantum Electronics*, vol. QE-10, No. 2, Feb. 1974, pp. 253-263.

Smith, Richard G., "Theory of Intracavity Optical Second-Harmonic Generation", *IEEE Journal of Quantum Electronics*, vol. Qe-6, No. 4, Apr. 1970, pp. 215-223.

Yarborough et al, "Enhancement of Optical Second Harmonic Generation by Utilizing the Dispersion of Air", *Applied Physics Letters*, vol. 18, No. 3, Feb. 1, 1971, pp. 70-73.

Oka et al, "Stable intracavity doubling of orthogonal lineraly polarized modes in diode-pumped ND: YAG lasers", *Optics Letters*, vol. 13, No. 10, Oct. 1988, pp. 805-807.

(List continued on next page.)

*Primary Examiner*—Leon Scott, Jr.
*Attorney, Agent, or Firm*—Killworth, Gottman, Hagan & Schaeff

[57] ABSTRACT

An intracavity frequency-doubled solid-state laser uses a Nd:GdVO$_4$ laser gain chip to generate a beam of visible laser light which may have wavelengths substantially in the green portion of the optical spectrum. A back end of the laser cavity is defined by an entrance mirror while a front end of the laser cavity is defined by a mirrored surface. A laser diode generates pump light which is transmitted through the entrance mirror into the laser gain chip. The laser gain chip, which may be immediately adjacent the entrance mirror, emits fundamental laser light having a wavelength of approximately 1063 nm in response to the pump light. A frequency doubler chip positioned immediately adjacent the laser gain chip doubles the frequency of the fundamental laser light to produce harmonic laser light having a wavelength of substantially 532 nm. In a second embodiment, the frequency doubler chip is immediately adjacent to the entrance mirror and the laser gain chip is immediately adjacent to the frequency doubler chip. The mirrored surface reflects a portion of the harmonic laser light back into the laser cavity and transmits a portion of the harmonic laser light from the laser.

17 Claims, 1 Drawing Sheet

OTHER PUBLICATIONS

James et al, "Intermittency and chaos in intracavity doubled lasers", *Physical Review A,* vol. 41, No. 5, Mar. 1, 1990, pp. 2778-2790.

Chinn et al, "Low-Threshold, Transversely Excited $NdP_5O_{14}$ Laser", *IEEE Journal of Quantum Electronics,* Sep. 1975, pp. 747-754.

Budin et al, "On the Design of Neodymium Miniature Lasers", *IEEE Journal of Quantum Electronics,* vol. QE-14, No. 11, Nov. 1978, pp. 831-839.

Budin et al, "Minitaure Nd-pentaphosphate laser with bonded mirrors side pumped with low-current density LED's", *Appl. Phys. Lett.* 33(4), Aug. 15, 1978, pp. 309-310.

Kubodera et al, "Stable $LiNdP_4O_{12}$ miniature laser", *Applied Optics,* vol. 18, No. 6, Mar. 15, 1979, pp. 884-890.

Weber et al, "Nd-ultraphosphate laser", *Appl. Phys. Letters,* vol. 22, No. 15, May 15, 1973, pp. 534-536.

Owyoung et al, "Gain switching of a monolithic single-frequency laser-diode-excited Nd: YAG laser", *Optics Letters,* vol. 10, No. 10, Oct. 1985, pp. 484-486.

Kubodera et al, "Spike-Mode Oscillations in Laser-Diode Pumped $LiNdP_4O_{12}$ Lasers", *IEEE Journal of Quantum Electronics,* vol. QE-17, No. 6, Jun., 1981, pp. 1139-1144.

Chinn, S. R., "Intracavity second-harmonic generation in a Nd pentaphosphate laser", *Appl. Phys. Lett.,* vol. 29, No. 3, Aug. 1, 1976, pp. 176-179.

Chesler et al, "Miniature diode-pumped Nd: YIAG lasers", *Appl. Phys. Lett.,* vol. 23, No. 5, Sep. 1, 1973, pp. 236-236.

Barnes, "Diode-pumped solid-state lasers", *J. Appl. Phys.,* vol. 44, No. 1, Jan. 1, 1973, pp. 230-237.

Ostermayer, Jr., "$GaAs_{1-z}P_z$ Diode Pumped YAG:Nd lasers", *Appl. Phys. Lett.,* vol. 18, No. 3, Feb. 1, 1971, pp. 93-96.

Allen et al, "Continuous Operation of a YAIG:Nd Laser by Injection Luminescent Pumping", *Appl. Phys. Lett.,* vol. 14, No. 6, Mar. 15, 1969, pp. 188-190.

Schmitt et al, "Diode-laser-pumped Nd:YAG laser injection seeding system", *Applied Optics,* vol. 25, No. 5, Mar. 1, 1986, pp. 629-633.

Baer, T., "Diode Laser Pumping of Solid-State Lasers", Reprint from *Laser Focus,* Jun. 1986.

Farmer et al, "Solid State Pumping Source for Nd:YAG Lasers with Integrated Focusing Optics", IBM Technical Disclosure Bulletin, vol. 15, No. 1, Jun. 1972, pp. 149-150.

Semiconductor Laser Specification Sheet, Toshiba Corporation, Feb. 9, 1987, 5 pages.

Data Sheet MOM-MM-163, "Cargille Meltmounts for Microscopy", Cargille Laboratories, Inc., Jan. 1, 1987, 2 pages.

Announcement Sheet, "CFE4 Spectroscopic properties and lasing of ND:GdVO4 pumped by a diode laser and a T:sapphire", Announced Feb. 1993.

Sorokin et al, "CW pasive mode-locking of a new $Nd^{3+}$:GdVO4 laser", ATuC2-1, Feb. 1993, pp. 203-205.

Ostroumov et al, "Nd:GdVO4 Crystal—a New Material for Diode-Pumped Solid-State Lasers", AMC1-1, Feb. 1993, pp. 52-54.

GADOLINIUM VANADATE LASER

BACKGROUND OF THE INVENTION

The present invention relates generally to solid-state lasers and, more particularly, to an intracavity frequency-doubled solid-state laser utilizing a neodymium-doped gadolinium vanadate ($Nd:GdVO_4$) lasing material to generate a visible laser beam suitable for use in numerous applications, including surveying, measurement and equipment control in the construction and agricultural industries.

A low powered solid-state laser which employs a laser gain chip of stoichiometric lasing material, such as a neodymium pentaphosphate (NPP), in a single laser cavity is disclosed in commonly assigned U.S. Pat. No. 4,884,281 issued to Hawthorn et al. The laser gain chip is bonded to a frequency doubler chip by coupling material having a refractive index matched to the two chips to reduce reflections at the bonded chip surfaces. In response to pump light from a laser diode, the laser gain chip emits fundamental laser light which has its wavelength halved as it passes through the frequency doubler chip. The second harmonic light is then reflected within the laser cavity to generate an output laser beam in a conventional manner.

The efficiency and performance of an intracavity frequency-doubled solid-state laser are dependent upon a number of factors. For instance, the transparency of the lasing material to second harmonic light greatly affects the performance of the laser. Typically, lasing materials employed in prior intracavity, frequency-doubled solid-state lasers have had poor transparency to second harmonic laser light. Due to this poor transparency, prior laser designs have either isolated the laser gain chip from the second harmonic light or discarded the second harmonic light which does pass through the laser gain chip. Each of these designs has disadvantages which limit the performance and efficiency of the laser. The first design necessary prohibits creating a resonant condition in the laser and, therefore, the well-known advantages from creating a resonant condition are not obtainable. The second design creates a relatively inefficient laser since a portion of the second harmonic light is discarded. Consequently, the lasing material should have a high transparency to second harmonic light to reduce attenuation of the second harmonic light as it passes through the material.

As is well known, a lasing material should have a broad absorption band to reduce problems associated with frequency drift of the pump laser diode and should have a narrow fluorescent emission band to allow high peak gain. The lasing material should also have a high absorption rate for the pump energy emitted by the pump laser diode. A high absorption rate increases the efficiency of the laser and permits the use of thin crystals of lasing material.

Accordingly, there is a need for an improved low cost, intracavity frequency-doubled solid-state laser which employs a lasing material having a high transparency to second harmonic light, a high absorption rate of pump energy, a large absorption band and a narrow fluorescent emission band.

SUMMARY OF THE INVENTION

This need is met by intracavity frequency-doubled solid-state lasers utilizing a $Nd:GdVO_4$ laser gain chip positioned in a laser cavity to generate fundamental laser light in accordance with the present invention. The frequency of the fundamental laser light is doubled by a frequency doubler chip to produce harmonic laser light which is transmitted from the laser cavity through an output coupler. Since the $Nd:GdVO_4$ laser gain chip has a high transparency to second harmonic light, the laser gain chip can be positioned in the laser cavity in a configuration wherein the second harmonic laser light is repeatedly passed through the laser gain chip with very little attenuation of the second harmonic laser light. Furthermore, the $Nd:GdVO_4$ laser gain chip has a high absorption rate of pump light which permits the use of a thinner and less expensive crystal. The $Nd:GdVO_4$ laser gain chip also has a large absorption band and a narrow fluorescent emission band which increase the efficiency of the laser.

In accordance with one aspect of the present invention, a solid-state laser comprises a laser cavity assembly which defines a laser cavity and a $Nd:GdVO_4$ laser gain chip positioned in the laser cavity for generating fundamental laser light in response to pump light. A frequency multiplier mounted in the laser cavity changes the frequency of the fundamental laser light generated by the laser gain chip. The frequency multiplier may be a frequency doubler chip made of potassium titanyl phosphate. A laser pump device generates the pump light and transmits the pump light into the laser gain chip causing the fluorescent emission of fundamental laser light.

Preferably, the laser gain chip and the frequency doubler chip are positioned immediately adjacent one another. The laser cavity assembly may include an input reflector for forming a back end of the laser cavity and output coupler including a mirrored surface forming a front end of the laser cavity.

In accordance with another aspect of the present invention, a solid-state laser comprises a laser cavity assembly for defining a laser cavity and including an input reflector, preferably an entrance mirror, for forming a back end of the laser cavity, and output coupler including a mirrored surface forming a front end of the laser cavity. A $Nd:GdVO_4$ laser gain chip, positioned within the laser cavity immediately adjacent the input reflector, generates fundamental laser light in response to pump light. A frequency multiplier is positioned within the laser cavity immediately adjacent the laser gain chip for changing the frequency of the fundamental laser light to produce harmonic laser light. A laser diode generates the pump light and transmits the pump light into the laser gain chip which lases to produce the fundamental laser light.

Preferably, the frequency multiplier includes a harmonic light generator for producing harmonic light having wavelengths substantially in the green portion of the optical spectrum.

The mirrored surface of the output coupler may reflect a portion of the harmonic laser light.

In accordance with yet another aspect of the present invention, a solid-state laser comprises a laser cavity assembly for defining a laser cavity and including an input reflector for forming a back end of the laser cavity and output coupler including a mirrored surface forming a front end of the laser cavity. A frequency multiplier positioned in the laser cavity immediately adjacent the input reflector changes the frequency of fundamental laser light which passes therethrough to produce harmonic laser light. The fundamental laser light is produced by a Nd:GdVO₄ laser gain chip, positioned in the laser cavity immediately adjacent the frequency multiplier, in response to pump light. A laser diode generates the pump light and transmits the pump light into the laser gain chip whereby the laser gain chip lases to produce the fundamental laser light which is reflected by the mirrored surface of the output coupler into the frequency multiplier.

It is an object of the present invention to provide an improved low cost, intracavity frequency-doubled solid-state laser for generating a visible laser beam which may have wavelengths in the green portion of the optical spectrum by means of a Nd:GdVO₄ laser gain chip and frequency doubler chip positioned in the laser cavity. The Nd:GdVO₄ laser gain chip has a large absorption band and a narrow fluorescent emission band which significantly increases the overall efficiency of the laser.

Other objects and advantages of the invention will be apparent from the following description, the accompanying drawings and the appended claims.

DETAILED DESCRIPTION OF THE INVENTION

Figure 1:
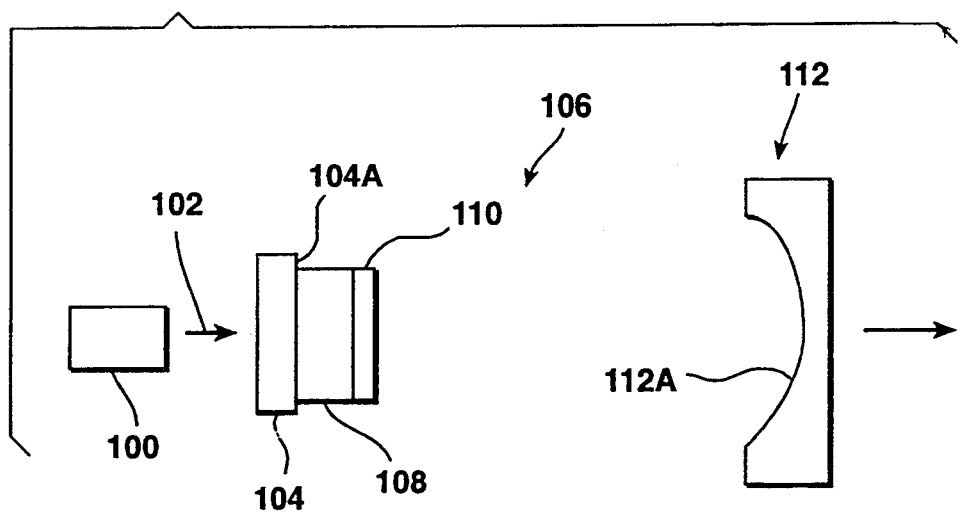
FIG. 1 is a schematic representation of an intracavity frequency-doubled solid-state laser utilizing a Nd:GdVO₄ laser gain chip in accordance with one embodiment of the present invention.

The solid-state laser shown in FIG. 1 includes a laser pump device comprising a laser diode 100, for example a LT017MD0 sold by The Sharp Corporation, which emits pump light 102 having wavelengths between approximately 804–810 nm with the typical pump light being 808 nm. The laser diode 100 transmits the pump light 102 onto an input reflector comprising an entrance mirror 104 having a mirrored surface 104A, preferably having a radius of 8 mm, which forms a back end of a laser cavity, generally designated by reference numeral 106. The laser cavity 106 preferably has an approximate length of 8 mm. As one skilled in the art will readily appreciate, various focusing optics may be employed to focus the pump light 102 onto the entrance mirror 104. These focusing optics could, for example, include a series of convex lenses or other lens configurations.

The entrance mirror 104 is highly transmissive to pump light having a wavelength of approximately 808 nm, highly reflective of light having a wavelength of approximately 1063 nm and partially reflective of light having a wavelength of approximately 532 nm. It has been found that an entrance mirror having around 90% reflectivity to light having a wavelength of 532 nm is preferred. The pump light 102 passes through the entrance mirror 104 and enters a neodymium-doped gadolinium vanadate (Nd:GdVO₄) laser gain chip 108, which preferably has a thickness of 0.5 mm, causing the chip 108 to emit fundamental laser light having a wavelength of about 1063 nm. The laser gain chip 108 is shown immediately adjacent to the entrance mirror 104; however, the laser gain chip 108 may be separated from the entrance mirror 104.

A frequency multiplier, shown as a frequency doubler chip 110, is positioned immediately adjacent the laser gain chip 108 and provides for doubling the frequency of the fundamental laser light generated by the laser gain chip 108 to thereby halve the light's wavelength and produce harmonic laser light. Preferably, the frequency doubler chip 110 has a thickness of 1.0 mm and is comprised of potassium titanyl phosphate (KTP). Coupling material may be used to bond the laser gain chip 108 to the frequency doubler chip 110. The coupling material has a refractive index matched to the two chips 108 and 110 to substantially reduce reflections at the bonded surfaces of the chips 108 and 110. Although the frequency doubler chip 110 is shown contiguous to the laser gain chip 108, the laser gain chip 108 and the frequency coupler chip 110 may be separated in the laser cavity 106. As is well known, the separated chips 108 and 110 may have anti-reflective coatings on their surfaces adjacent to the air to reduce unwanted reflections.

An output coupler 112 comprises a mirrored surface 112A forming a front end of the laser cavity 106 extending between the mirrored surface 104A and the mirrored surface 112A. The mirrored surface 112A is highly reflective to light having a wavelength of about 1063 nm and partially reflective to light having a wavelength of about 532 nm. Preferably, the mirrored surface 112A has around 5% reflectivity for light having a wavelength of around 532 nm. The solid-state laser of the present invention thus transmits laser light having a wavelength substantially in the green portion of the optical spectrum.

In operation, the pump light 102 generated by the laser diode 100 is focused through the entrance mirror 104 into the laser gain chip 108 which lases to generate fundamental laser light having a wavelength of substantially 1063 nm. The fundamental laser light is transmitted through the coupling material into the frequency doubler chip 110 which transforms a portion of the fundamental laser light into harmonic laser light having a wavelength of approximately 532 nm. To substantially eliminate fundamental laser light passing back through the entrance mirror 104, the mirrored surface 104A is highly reflective of light having a wavelength of 1063 nm.

Since the output coupler 112 is partially transmissive of harmonic laser light having a wavelength of around 532 nm, a portion of the harmonic laser light is emitted by the solid-state laser shown in FIG. 1. The remaining portion of the harmonic laser light is reflected by the mirrored surface 112A to the mirrored surface 104A passing through the frequency doubler chip 110 and the laser gain chip 108. The Nd:GdVO₄ lasing material is highly transparent to harmonic laser light having a wavelength of substantially 523 nm and, therefore, very little attenuation occurs as the harmonic laser light passes through the chip 108.

The output coupler 112 is highly reflective of fundamental laser light having a wavelength of approximately 1063 nm and, consequently, substantially all of the fundamental laser light is reflected from the mirrored surface 112A to the mirrored surface 104A passing through the frequency doubler chip 110 and the laser gain chip 108. Repeated passes of the fundamental laser light in the laser cavity 106 result in additional conversion of the fundamental laser light into harmonic laser light.

During traversal of the laser cavity 106, the phase of the harmonic laser light reflected from the mirrored surface 112A is preferably shifted to reduce the possibility of destructive interference with the harmonic laser light being generated by the frequency doubler chip 110 toward the output coupler 112. A method of controlling the phase of the harmonic laser light is disclosed in U.S. patent application Ser. No. 08/252,048, entitled "EFFICIENT LINEAR FREQUENCY DOUBLED SOLID-STATE LASER" (attorney's docket number SPC188PA), by Klemer et al., concurrently filed herewith, the disclosure of which is hereby incorporated by reference.

Figure 2:
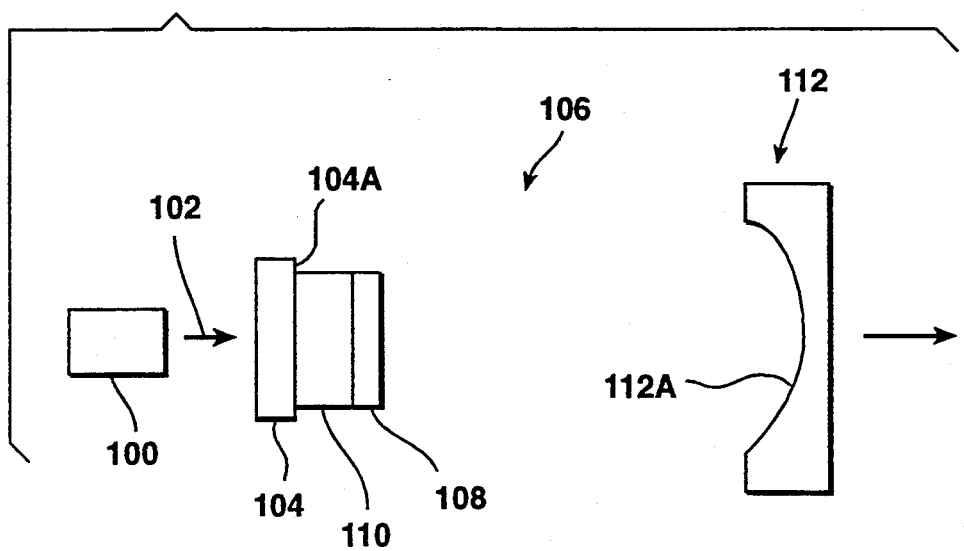
FIG. 2 is a schematic representation of an intracavity frequency-doubled solid-state laser utilizing a Nd:GdVO₄ laser gain chip in accordance with another embodiment of the present invention.

In the embodiment of the invention shown in FIG. 2, the solid-state laser is substantially the same as that shown in FIG. 1 with the exception that the frequency doubler chip 110 is now bonded directly to the entrance mirror 104. In operation, the pump light 102 passes through both the entrance mirror 104 and the frequency doubler chip 110 before entering the laser gain chip 108. The laser gain chip 108 emits fundamental laser light having a wavelength of substantially 1063 nm in response to the pump light 102.

The fundamental laser light is reflected by mirrored surface 112A to mirrored surface 104A passing through the laser gain chip 108 and the frequency doubler chip 110. The mirrored surface 104A reflects the fundamental laser light into the frequency doubler chip 110 which doubles the frequency of a portion of the fundamental laser light to produce harmonic laser light having a wavelength of approximately 532 nm. A portion of the harmonic laser light is transmitted from the output coupler 112 after passing through the laser gain chip 108. As noted previously, the Nd:GdVO$_4$ laser gain chip 108 is highly transparent to the harmonic laser light and, therefore, very suitable for such a configuration wherein the harmonic laser light is repeatedly reflected therethrough. Repeated traversals of the laser cavity 106 result in additional conversion of fundamental laser light into harmonic laser light.

The Nd:GdVO$_4$ laser gain chip has various optical characteristics which makes it very suitable for use in the intracavity laser of the invention. Firstly, the high transparency of the Nd:GdVO$_4$ laser gain chip to second harmonic light permits repeated passes of the second harmonic light through the laser gain chip with negligible losses. Secondly, the Nd:GdVO$_4$ laser gain chip is a highly efficient absorber of pump light and, therefore, thin and less expensive crystals of Nd:GdVO$_4$ can be employed than in the popular Nd:YAG and Nd:YVO$_4$ lasers. Finally, the Nd:GdVO$_4$ laser gain chip exhibits a large absorption band and a narrow fluorescent emission band which significantly increase the efficiency of the laser.

Having thus described the invention in detail by way of reference to preferred embodiments thereof, it will be apparent that other modifications and variations are possible without departing from the scope of the invention defined in the appended claims.

What is claimed is:

1. A solid-state laser comprising:
   a laser cavity assembly for defining a laser cavity;
   a Nd:GdVO$_4$ laser gain chip positioned in said laser cavity for generating fundamental laser light in response to pump light;
   a frequency multiplier mounted in said laser cavity for changing the frequency of said fundamental laser light generated by said laser gain chip; and
   a laser pump device for generating said pump light and for transmitting said pump light into said laser gain chip which emits said fundamental laser light in response thereto.

2. The solid-state laser as recited in claim 1 wherein said frequency multiplier comprises a frequency doubler chip.

3. The solid-state laser as recited in claim 2 wherein said frequency doubler chip is potassium titanyl phosphate.

4. The solid-state laser as recited in claim 2 wherein said laser gain chip and said frequency doubler chip are positioned immediately adjacent one another.

5. The solid-state laser as recited in claim 1 wherein said laser cavity assembly comprises:
   an input reflector for forming a back end of said laser cavity; and
   an output coupler including a mirrored surface forming a front end of said laser cavity.

6. A solid-state laser comprising:
   a laser cavity assembly for defining a laser cavity including
     an input reflector for forming a back end of said laser cavity, and
     an output coupler including a mirrored surface forming a front end of said laser cavity;
   a Nd:GdVO$_4$ laser gain chip positioned within said laser cavity immediately adjacent said input reflector for generating fundamental laser light in response to pump light;
   a frequency multiplier positioned within said laser cavity immediately adjacent said laser gain chip for changing the frequency of said fundamental laser light to produce harmonic laser light; and
   a laser diode for generating said pump light and for transmitting said pump light into said laser gain chip which lases to produce said fundamental laser light in response thereto.

7. The solid-state laser as recited in claim 6 wherein said input reflector comprises an entrance mirror.

8. The solid-state laser as recited in claim 6 wherein said frequency multiplier is a frequency doubler chip.

9. The solid-state laser as recited in claim 8 wherein said frequency doubler chip is potassium titanyl phosphate.

10. The solid-state laser as recited in claim 6 wherein said frequency multiplier includes a harmonic light generator for producing harmonic laser light having wavelengths substantially in the green portion of the optical spectrum.

11. The solid-state laser as recited in claim 10 wherein said mirrored surface of said output coupler reflects a portion of said harmonic laser light.

12. A solid-state laser comprising:
   a laser cavity assembly for defining a laser cavity including
     an input reflector for forming a back end of said laser cavity, and
     an output coupler including a mirrored surface forming a front end of said laser cavity;
   an frequency multiplier positioned in said laser cavity immediately adjacent said input reflector for changing the frequency of fundamental laser light to produce harmonic laser light;
   a Nd:GdVO$_4$ laser gain chip positioned in said laser cavity immediately adjacent said frequency multiplier for generating said fundamental laser light in response to pump light; and
   a laser diode for generating said pump light and for transmitting said pump light into said laser gain chip in response to which said laser gain chip lases to produce said fundamental laser light which is reflected by said mirrored surface of said output coupler into said frequency multiplier.

13. The solid-state laser as recited in claim 12 wherein said input reflector comprises an entrance mirror.

14. The solid-state laser as recited in claim 12 wherein said frequency multiplier is a frequency doubler chip.

15. The solid-state laser as recited in claim 14 wherein said frequency doubler chip is potassium titanyl phosphate.

16. The solid-state laser as recited in claim 12 wherein said frequency multiplier includes a harmonic light generator for producing harmonic laser light having wavelengths substantially in the green portion of the optical spectrum.

17. The solid-state laser as recited in claim 12 wherein said mirrored surface of said output coupler reflects a portion of said harmonic laser light.

* * * * *